United States Patent
Yamamoto et al.

(10) Patent No.: US 6,844,275 B2
(45) Date of Patent: Jan. 18, 2005

(54) HEAT-RESISTANT FABRIC AND METHOD FOR PRODUCTION THEREOF

(75) Inventors: Hideyuki Yamamoto, Shiga (JP); Makoto Nakahara, Shiga (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/111,204

(22) PCT Filed: Sep. 3, 2001

(86) PCT No.: PCT/JP01/07601
§ 371 (c)(1),
(2), (4) Date: Apr. 23, 2002

(87) PCT Pub. No.: WO02/20891
PCT Pub. Date: Mar. 14, 2002

(65) Prior Publication Data
US 2002/0182966 A1 Dec. 5, 2002

(30) Foreign Application Priority Data
Sep. 6, 2000 (JP) ........................................ 2000-270238

(51) Int. Cl.$^7$ ........................... B32B 27/12; B32B 27/04
(52) U.S. Cl. ....................... 442/136; 442/164; 442/414; 428/920; 428/921; 427/372.2; 427/397.7; 427/397.8
(58) Field of Search ................................. 428/920, 921; 442/136, 414, 327, 164; 427/372.2, 397.7, 397.8

(56) References Cited

U.S. PATENT DOCUMENTS

| | | | | |
|---|---|---|---|---|
| 3,259,536 A | * | 7/1966 | Rudolf et al. | 442/13 |
| 3,348,994 A | * | 10/1967 | Rees et al. | 428/221 |
| 4,357,387 A | * | 11/1982 | George et al. | 442/71 |
| 6,103,643 A | | 8/2000 | Forsten | |

FOREIGN PATENT DOCUMENTS

| | | |
|---|---|---|
| JP | 11-309316 | 11/1999 |
| JP | 11-333226 | 12/1999 |
| JP | 2000-225349 | 8/2000 |
| JP | 2001-262468 | 9/2001 |

* cited by examiner

*Primary Examiner*—Ula Ruddock
(74) *Attorney, Agent, or Firm*—Piper Rudnick LLP

(57) ABSTRACT

The object of this invention is to provide a heat resistant fabric having high stiffness at high temperature and also high chemicals resistance.

The heat resistant fabric of this invention is a fabric consisting of heat resistant fibers, characterized in that the contacts between the fibers constituting the fabric are bound by means of an inorganic binder. Furthermore, a preferable process for preparing the heat resistant fabric of this invention comprises the steps of impregnating a fabric consisting of heat resistant fibers with a sodium silicate aqueous solution, and drying in an atmosphere containing carbon dioxide, to bind the contacts between the fibers constituting the fabric by means of silicon oxide.

5 Claims, 1 Drawing Sheet

HEAT-RESISTANT FABRIC AND METHOD FOR PRODUCTION THEREOF

TECHNICAL FIELD

The present invention relates to a heat resistant fabric having not only excellent heat resistance and chemicals resistance but also excellent shape maintenance at high temperature. Above all, the heat resistant fabric of this invention can be suitably used as a filter medium of a pleated bag filter used at high temperature in the presence of chemicals.

BACKGROUND ART

Bag filters are generally used as filters for collecting the dust discharged from municipal refuse incinerators, coal boilers, metal melting furnaces, etc. In these furnaces, since the temperature of the exhaust gas reaches as high as 130 to 250° C., the filter media are required to be resistant against heat. Furthermore, depending on applications, the exhaust gases may contain chemicals, and in this case, the filter media are required to be resistant also against chemicals.

The conventional filter cloths used as filter media required to have such heat resistance and chemicals resistance are felts obtained by laminating ground fabrics and webs prepared using such materials as polyphenylene sulfide (hereinafter abbreviated as PPS) fibers, meta-aramid fibers, polyimide fibers, fluorine fibers or glass fibers, and treating the laminates by means of a needle punch, water jet or the like for entangling the fibers.

In recent years, for the purposes of improving the filtration efficiency and reducing the size of dust collectors, filter media having larger filtration areas are demanded, and it is considered to pleat the filter media for increasing filtration areas. However, the conventional felts have such problems that pleating is difficult since the conventional felts are insufficient in stiffness and that even if they are pleated, the pleated forms cannot be maintained.

As a method for solving the problems, U.S. Pat. No. 6,103,643 proposed a filter medium with higher stiffness obtained by impregnating a nonwoven fabric consisting of PPS fibers with a synthetic resin. However, the synthetic resin-impregnated nonwoven fabric of U.S. Pat. No. 6,103,643 has such problems that the stiffness declines at high temperature to lower the shape maintenance of pleats and that the chemicals resistance is insufficient. There is also a problem that if the fabric is exposed to high temperature for a long time, the strength declines remarkably.

DISCLOSURE OF THE INVENTION

In view of these problems of the prior art, an object of the present invention is to provide a heat resistant fabric that has high stiffness even at high temperature and also has high chemicals resistance. Another object is to provide a heat resistant fabric that is less lowered in strength even if it is exposed to high temperature for a long time.

This invention for solving the above problems employs the following means. The heat resistant fabric of this invention is a fabric consisting of heat resistant fibers, characterized in that the contacts between the fibers constituting the fabric are bound by means of an inorganic binder. Furthermore, a preferable process for preparing the heat resistant fabric of this invention comprises the steps of impregnating a fabric consisting of heat resistant fibers with a sodium silicate aqueous solution, and drying in an atmosphere containing carbon dioxide, to bind the contacts between the fibers constituting the fabric by means of silicon oxide.

THE BEST MODES FOR CARRYING OUT THE INVENTION

Figure 1:
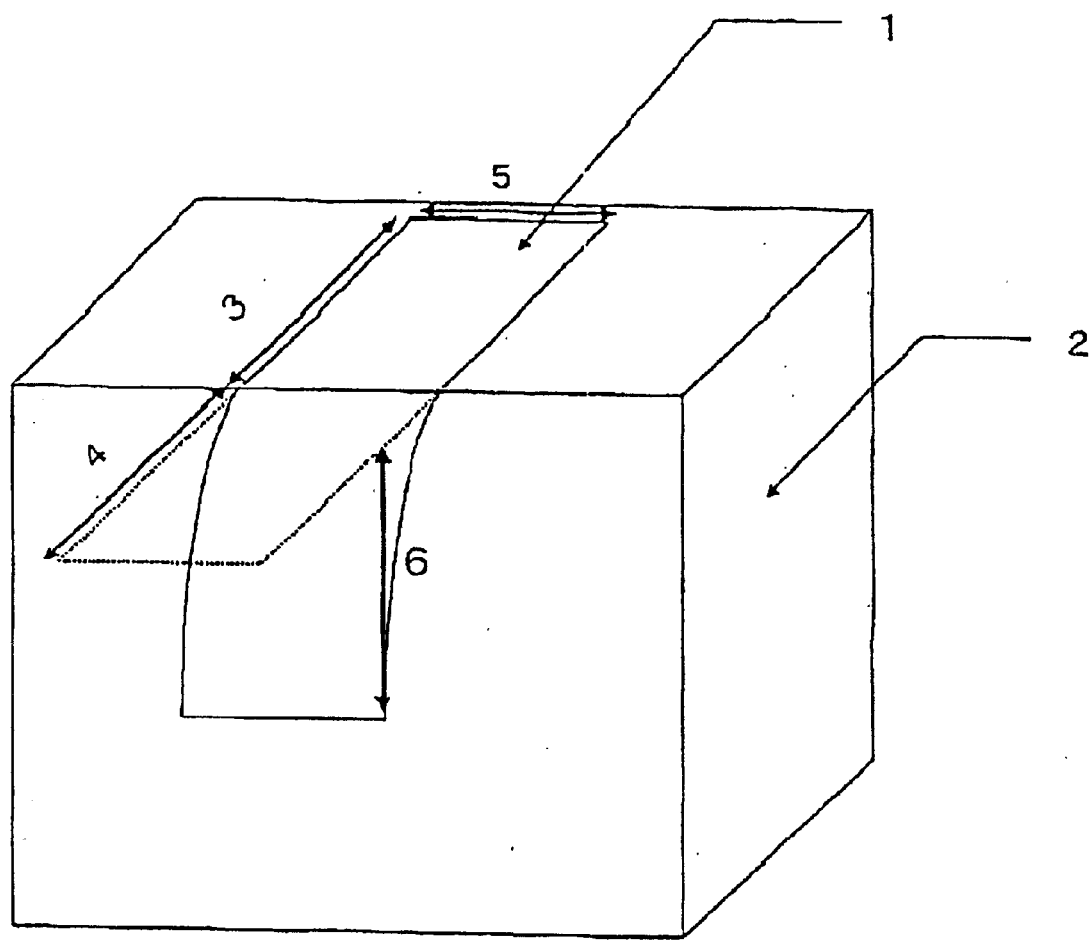
FIG. 1 is an illustration for measuring the drooping degree of a fabric at high temperature (indicator expressing high temperature stiffness). Respective symbols indicate: (1) test fabric, (2) testing table, (3) length of test fabric on the table, (4) protruding length of test fabric, (5) width of test fabric, and (6) drooping distance of test fabric.

The inventors studied intensively to achieve the object of obtaining a heat resistant fabric having high stiffness even at high temperature and excellent chemicals resistance, and as a result, found that the problems can be solved all at once if a fabric consisting of heat resistant fibers is bound using an inorganic binder. Thus, the present invention has been arrived at.

Furthermore, the inventors found that a heat resistant fabric obtained by impregnating a fabric consisting of heat resistant fibers with an inorganic binder and binding the contacts between the fibers constituting the fabric using the inorganic binder is less lowered in strength even if exposed to high temperature for a long time.

The largest feature of this invention is to use an inorganic binder, not a synthetic resin binder. Since an inorganic binder is used, a fabric having both excellent heat resistance and chemicals resistance can be obtained. Furthermore, since an inorganic binder is used, high stiffness can be imparted. As a result, such features can be exhibited, that high stiffness can be maintained even at high temperature, and that even if the fabric is allowed to stand at high temperature for a long time, the decline of stiffness can be kept very small while the decline of various mechanical properties is also small.

The inorganic binder usable in this invention can be cement, water glass, etc. Among them, water glass can be preferably used. The water glass refers to a sodium silicate aqueous solution represented by formula 1. If it is made to react with carbon dioxide, glass, i.e., silicon oxide can be produced.

Sodium silicate aqueous solution: $Na_2O.nSiO_2.xH_2O$ (Formula 1) Reaction formula of sodium silicate: $Na_2O.nSiO_2+CO_2->Na_2CO_3+nSiO_2$ (Formula 2)
(In the above formulae, n denotes an integer of 1 or more, usually 1 to 5, and x denotes an integer of 1 or more and can be adjusted anyway by adjusting the concentration of the aqueous solution.)

Water glass is used as a binder to be impregnated into a fabric, and the fabric is dried in an atmosphere containing carbon dioxide. After the reaction with carbon dioxide, at least the contacts between the fibers are bound by means of silicon oxide. In this case, the atmosphere containing carbon dioxide can be the atmosphere. The atmosphere (air) usually contains about 1% of carbon dioxide ($CO_2$), and unless the atmosphere is enclosed, carbon dioxide can be sufficiently supplied from the surrounding till the reaction of formula 2 is completed.

The silicon oxide thus obtained contains sodium carbonate as impurity, but to achieve the objects of this invention, the impurity does not exert any influence at all. The silicon oxide mixture is a kind of glass and has high heat resistance and high chemicals resistance, needless to say, being able to achieve the objects of this invention sufficiently.

The inorganic binder used in this invention is deposited to bind the contacts between the fibers constituting the fabric, to inhibit the relative movement between fibers. So, the fabric can have stiffness. When the inorganic binder is deposited to bind the contacts between fibers, it can bind in hyperbolic forms or points, but binding in hyperbolic forms is preferable since the resistance against physical deformation is higher. Furthermore, the inorganic binder used in this invention can be deposited also on the surfaces of fibers other than the intersections between fibers.

The fabric mainly consisting of heat resistant fibers used in this invention can have any fabric structure of woven fabric, knitted fabric, nonwoven fabric or the like, and can be suitably used as a filter medium. A nonwoven fabric is especially preferable since the filter can have higher collection efficiency.

The nonwoven fabric can be either a staple fiber nonwoven fabric produced according to the carding method, air laid method or the like, or a continuous fiber nonwoven fabric produced according to the spunbond method, tow direct opening method or the like, and can also be a paper-like fabric produced according to the paper making method. For entangling fibers, any method such as needle punch method, water jet entangling method or thermal bonding method can be preferably used. Among them, a needle-punched or water-jet-entangled staple fiber nonwoven fabric or a thermally spun-bonded nonwoven fabric can be especially preferably used.

The fibers constituting the fabric used in this invention must be heat resistant fibers, considering the use at high temperature. The heat resistant fibers refer to fibers having a melting point of higher than 230° C. or no melting point. In view of heat resistance, fibers having a melting point of higher than 250° C. or no melting point are more preferred.

The fibers constituting the fabric used in this invention can be one or more kinds of fibers selected, for example, from heat resistant organic fibers such as PPS fibers, aramid fibers including meta-aramid fibers and para-aramid fibers, polytetrafluoroethylene (hereinafter abbreviated as PTFE) fibers, polyimide fibers, fully aromatic polyester fibers, liquid crystal polyester fibers, polyparaphenylenebenzobisoxazole fibers and carbon fibers, and inorganic fibers such as glass fibers and metallic fibers.

The aforesaid particular heat resistant fibers include fibers relatively poor in chemicals resistance. However, for example, when an inorganic binder such as water glass is impregnated and solidified, the inorganic binder binds the contacts between fibers and further forms an inorganic film on the surfaces of the heat resistant fibers, to improve the chemicals resistance.

To exhibit better chemicals resistance, it is preferred that the heat resistant fibers per se have high chemicals resistance. For example, at least one kind of fibers selected from PPS fibers, aramid fibers including meta-aramid fibers and para-aramid fibers, PTFE fibers, polyimide fibers and glass fibers can be preferably used.

These kinds of heat resistant fibers can be mixed or processed together by a usually used method such as combining, blending, twill weaving and layering. These heat resistant fibers can also be used as main fibers together with fibers having no heat resistance, to such an extent that the effects of this invention are not impaired.

As the heat resistant fibers used in this invention, PPS fibers are especially preferred. The chemicals resistance of PPS fibers is very excellent though not so high as that of PTFE fibers. In addition, PPS fibers can be preferably used also in view of low cost. Depending on the environment where the fabric is used, it is preferred that PPS fibers are used as main fibers to be mixed with other fibers. For example, PPS fibers can be used as main fibers to be mixed with about 30 wt % of glass fibers, or PPS fibers can be used as main fibers to be mixed with about 30 wt % of para-aramid fibers, to enhance the stiffness in a high temperature range of 170 to 250° C. to higher than the level achieved by using 100 wt % PPS fibers.

In this case, to keep the chemicals resistance good, it is preferred to use 50 wt % or more of PPS fibers as main fibers. If the amount of PPS fibers is less than 50 wt %, it can happen that while the fabric is used in a severe environment such as exposure to chemicals for a long time, the fibers poor in chemicals resistance other than PPS fibers are deteriorated to impair the strength and stiffness of the fabric per se.

In the case where a fabric containing 50 wt % or more of PPS fibers is used, a nonwoven fabric is preferred in view of maintaining the properties as a filter, and it is preferred in view of chemicals resistance, that the contacts between fibers are bound by means of silicon oxide.

It is preferred that the heat resistant fabric of this invention is 50% or more in the tensile strength holding rate after having been treated at 250° C. in an atmosphere of ordinary oxygen concentration for 10 days. If the tensile strength holding rate is less than 50%, it can happen that the service life of the filter used at high temperature becomes short due to the decline of strength. As the apparatus used for heat treatment at 250° C., a hot air dryer can be preferably used.

A preferable process for producing the fabric having heat resistance and chemicals resistance described above is described below.

A fabric consisting of heat resistant fibers is impregnated with a sodium silicate aqueous solution and dried in an atmosphere containing carbon dioxide, to bind at least the contacts between the fibers constituting the fabric by means of silicon oxide. This is a preferable process for producing the heat resistant fabric of this invention.

The sodium silicate aqueous solution represented by said formula 1 can be applied to coat or impregnate the fabric at room temperature using a fabric finish-processing machine such as a dip mangle, sprayer or coater. It is preferred to impregnate the fabric using a dip mangle. Furthermore, since a sodium silicate aqueous solution can be simply diluted with water, the amount of silicon oxide deposited on the fabric can be controlled to a desired amount.

Then, the heat resistant fabric impregnated with the sodium silicate aqueous solution is dried. For drying, an ordinary fabric finish-processing machine such as a pin tenter or vertical non-touch dryer can be used as it is.

To solidify the sodium silicate aqueous solution, carbon dioxide is necessary as shown in formula 2. In this case, the amount of carbon dioxide contained in ordinary atmosphere is sufficient for completing the reaction represented by formula 2 if the temperature is higher than 100° C. That is, a usually used well-known fabric finish-processing machine and process can be used to sufficiently bind the contacts between fibers by means of silicon oxide.

The heat resistant fabric of this invention is not especially limited in application, and, for example, it can be preferably used as a filter medium, particularly as a filter medium for a pleated bag filter.

EXAMPLES

This invention is described below particularly in reference to examples. The examples are merely preferable embodiments of this invention.

The stiffness at high temperature, heat resistance, chemicals resistance and strength holding rate at high temperature of the heat resistant fabrics prepared in the examples and comparative examples were measured according to the following methods.

(Stiffness at High Temperature)

The stiffness was measured according to the procedure shown in FIG. 1. A test fabric 1 cut to have a length (3+4) of 200 mm and a width (5) of 20 mm was prepared. A 100 mm long portion (3) of the test fabric 1 was fixed on a test table 2, and the remaining 100 mm long portion (4) was protruded from the test table 2. The test fabric was allowed to stand in an atmosphere of 170° C. for 1 hour. Then, the portion protruded from the test table 2, of the test fabric 1 drooped due to softening, and the drooping distance was measured. That is, the vertical distance between the end of the drooping portion and the horizontal plane containing the top surface of the test table was identified as the drooping distance (6). A smaller drooping distance (6) means higher stiffness at high temperature.

(Heat Resistance: Long-Time Heat Resistance)

As described for the aforesaid stiffness at high temperature, a test fabric 1 was cut to have a length (3+4) of 200 mm and a width (5) of 20 mm. A 100 mm long portion (3) of the test fabric 1 was fixed on a test table 2, and the remaining 100 mm long portion (4) was protruded from the test table 2. The test fabric was allowed to stand in an atmosphere of 170° C. for 500 hours. The portion protruded from the test table, of the test fabric drooped. The vertical distance between the end of the drooping portion and the horizontal plane containing the top surface of the test table was measured. The difference between the drooping distance after treating for 500 hours and the drooping distance as stiffness at high temperature was obtained. A smaller difference means higher heat resistance.

(Chemicals Resistance)

A test fabric was treated in methyl ethyl ketone solvent for 500 hours. The drooping distance of the treated fabric was measured as described for the aforesaid stiffness at high temperature. The difference between this drooping distance and the drooping distance of the test fabric not immersed in methyl ethyl ketone was obtained. A smaller difference means higher chemicals resistance.

(Strength Holding Rate at High Temperature)

A test fabric was allowed to stand in a 250° C. hot air dryer for 10 days. The heat-treated fabric was tensile-tested with 5 cm width, 10 cm grip interval and 10 cm/min tensile speed, to measure the breaking strength. On the other hand, a fabric not treated at 250° C. for 10 days was similarly tensile-tested to measure the breaking strength. (Breaking strength after treatment/Breaking strength before treatment) ×100 (%) was calculated as the strength holding rate at high temperature.

Example 1

PPS staple fibers ("Torcon" produced by Toray Industries, Inc.; 2.2 dtex, 51 mm cut) were opened using an opener and carded using a card, and the obtained web was needle-punched to prepare a nonwoven fabric with a unit weight of 250 g/m$^2$. The needle-punched nonwoven fabric was calender-rolled to form a 1.2 mm thick nonwoven fabric.

The nonwoven fabric was impregnated with a sodium silicate aqueous solution (water glass), mangled using a mangle, and dried in 190° C. hot air for 10 minutes using a hot air dryer, to obtain a stiff fabric, in which the weight of the inorganic solid was 35% based on the weight of the nonwoven fabric fibers.

The stiff fabric was tested to measure the stiffness at high temperature, heat resistance, chemicals resistance and strength holding rate at high temperature. The results are shown in Table 1.

Example 2

Eighty weight percent of PPS staple fibers ("Torcon" produced by Toray Industries, Inc.; 2.2 dtex, 51 mm cut) and 20 wt % of para-aramid fibers ("Kevlar" produced by Du Pont-Toray Co., Ltd.; 1.7 dtex, 51 mm cut) were mixed to form a web, and the web was needle-punched to produce a nonwoven fabric with a unit weight of 250 g/m$^2$. The needle-punched nonwoven fabric was calender-rolled to form a 1.2 mm thick nonwoven fabric.

The nonwoven fabric was impregnated with a sodium silicate aqueous solution (water glass) and dried to obtain a stiff fabric as described for Example 1.

The stiff fabric was tested to measure the stiffness at high temperature, heat resistance, chemicals resistance and strength holding rate at high temperature.

Comparative Example 1

A 1.2 mm thick nonwoven fabric was prepared as described for Example 1.

The nonwoven fabric was impregnated with an epoxy resin ("DIC Fine EN0270" produced by Dainippon Ink and Chemicals, Inc.), mangled using a mangle and dried in 190° C. hot air for 10 minutes using a hot air dryer, to obtain a stiff fabric, in which the weight of the solid resin was 35% based on the weight of the nonwoven fabric fibers.

The stiff fabric was tested to measure the stiffness at high temperature, heat resistance, chemicals resistance and strength holding rate at high temperature. The results are shown in Table 1.

Comparative Example 2

A 1.2 mm thick nonwoven fabric was prepared as described for Example 2.

The nonwoven fabric was impregnated with an epoxy resin ("DIC Fine EN0270" produced by Dainippon Ink and Chemicals, Inc.), mangled using a mangle and dried in 190° C. hot air for 10 minutes using a hot air dryer, to obtain a stiff fabric, in which the weight of the solid resin was 35% based on the weight of the nonwoven fabric fibers.

The stiff fabric was tested to measure the stiffness at high temperature, heat resistance, chemicals resistance and strength holding rate at high temperature. The results are shown in Table 1.

As can be seen from Table 1, in the comparison between Example 1 and Comparative Example 1 and in the comparison between Example 2 and Comparative Example 2, the examples of this invention were excellent in all the items of stiffness at high temperature, long-time heat resistance and chemicals resistance compared with the comparative examples. Furthermore, in Comparative Examples 1 and 2, the long-time treatments at high temperature lowered the strength holding rate to less than 20%, but the treatments in Examples 1 and 2 could keep the strength holding rate as high as more than 60%.

INDUSTRIAL APPLICABILITY

The heat resistant fabric of this invention has not only excellent heat resistance and chemicals resistance but also excellent shape maintenance at high temperature. The heat resistant fabric of this invention is suitable as a filter medium for collecting the hot dust discharged from municipal refuse incinerators, coal boilers, metal melting furnaces and the like, and especially suitable as a pleated filter medium, being a highly practical fabric.

TABLE 1

|  | Example 1 | Example 2 | Comparative Example 1 | Comparative Example 2 |
| --- | --- | --- | --- | --- |
| Fibers used | PPS 100% | PPS 80% + Kevlar 20% | PPS 100% | PPS 80% + Kevlar 20% |
| Binder used | Sodium silicate (water glass) | Sodium silicate (water glass) | Epoxy resin | Epoxy resin |
| Stiffness at high temperature (drooping distance) | 45 mm | 25 mm | 62 mm | 39 mm |
| Heat resistance: Long-time heat resistance (difference between the stiffness after long-time treatment and the stiffness at high temperature) | 52 mm (+7 mm) | 33 mm (+8 mm) | 70 mm (+8 mm) | 48 mm (+9 mm) |
| Chemicals resistance (difference between the stiffness after chemical treatment and the stiffness at high temperature) | 44 mm (−1 mm) | 26 mm (+1 mm) | 68 mm (+6 mm) | 44 mm (+5 mm) |
| Strength holding rate at high temperature | 86% | 69% | 18% | 19% |

What is claimed is:

1. A heat resistant fabric comprising heat resistant fibers containing 50 wt % or more of polyphenylene sulfide fibers, wherein contacts between the fibers constituting the fabric are bound with an inorganic binder, to inhibit relative movement of the fibers.

2. A heat resistant fabric, according to claim 1, which is a nonwoven fabric.

3. A heat resistant fabric, according to claim 1, wherein the inorganic binder is silicon oxide.

4. A heat resistant fabric, according to claim 1, which is 50% or more in the tensile strength holding rate after having been treated at 250° C. for 10 days.

5. A process for producing a heat resistant fabric, comprising the steps of impregnating a fabric comprising heat resistant fibers containing 50 wt % or more of polyphenylene sulfide fibers with a sodium silicate aqueous solution, and drying in an atmosphere containing carbon dioxide, to bind the contacts between the fibers constituting the fabric with silicon oxide, to inhibit relative movement of the fibers.

* * * * *